J. T. ROFFY.
ILLUMINATING APPARATUS.
APPLICATION FILED FEB. 3, 1917.
1,245,512.
Patented Nov. 6, 1917.
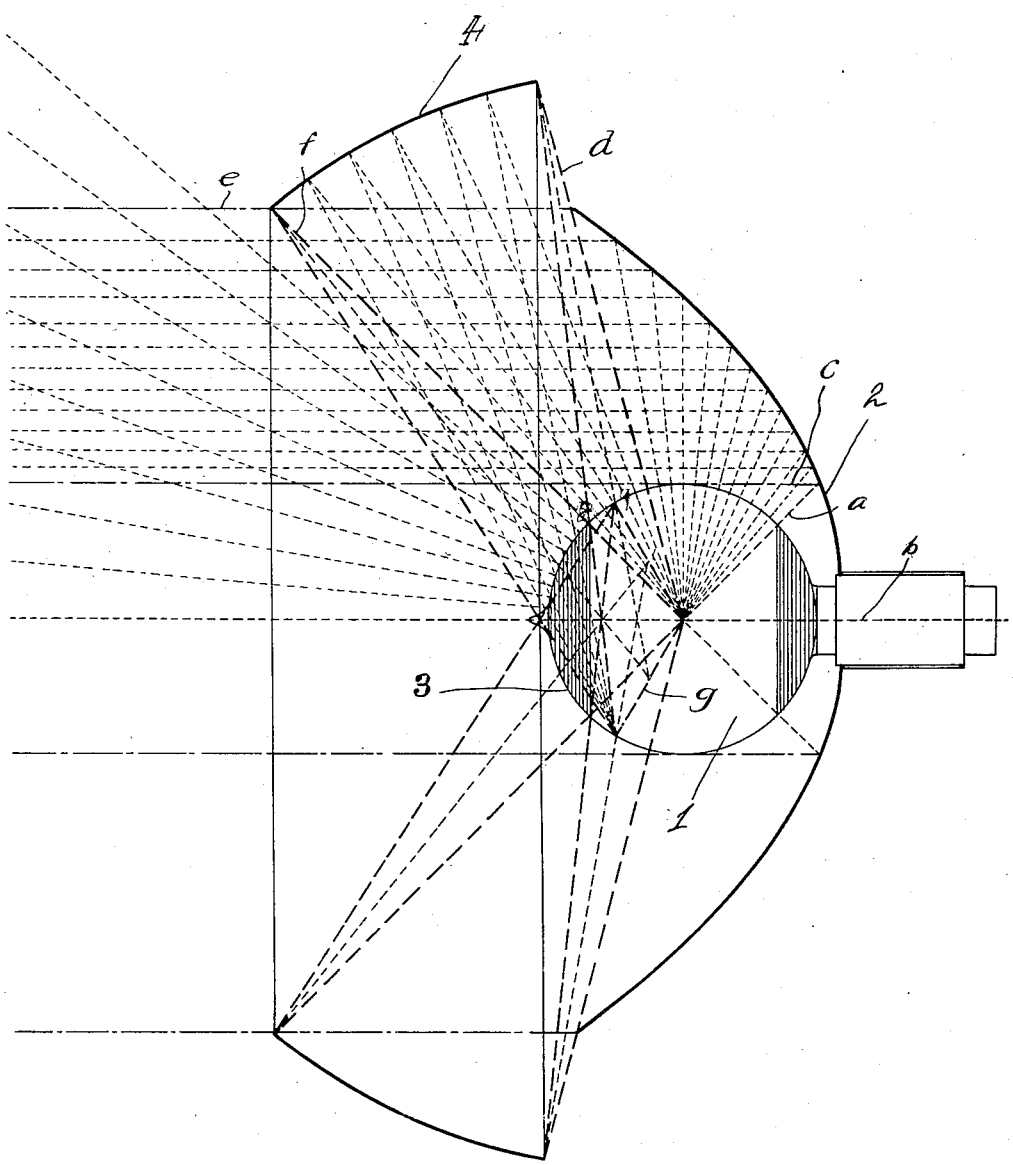
Joseph T. Roffy
INVENTOR
BY Knight Bros
his ATTORNEYS

UNITED STATES PATENT OFFICE.

JOSEPH T. ROFFY, OF PITTSBURGH, PENNSYLVANIA.

ILLUMINATING APPARATUS.

1,245,512.   Specification of Letters Patent.   Patented Nov. 6, 1917.

Application filed February 3, 1917. Serial No. 146,425.

*To all whom it may concern:*

Be it known that I, JOSEPH T. ROFFY, a subject of the Emperor of Austria, residing in Pittsburgh, county of Allegheny, and State of Pennsylvania, have invented certain new and useful Improvements in Illuminating Apparatus, of which the following is a specification.

My invention relates to illuminating apparatus and more especially to headlights, projectors and similar devices for use on vehicles or wherever a projected main beam together with a subdued general illumination is required.

The object of the invention is primarily to obtain a particularly advantageous illumination, as well as to provide a marker light which is readily visible when the main source is dimmed. More specifically speaking, my purpose is to improve the general diffused illumination and the luminous effect in the marker of for example, a headlight or projector employed on automobiles. The glare from automobile projectors has been the source of serious complaint to the unlimited use of such lamps, especially in city streets, with the result that public highway ordinances have sought to regulate their use. To avoid the objectionable glare, it has already been proposed to temporarily dim the main source of light by suitable contrivance during the time when the full light beam is not required. The lamp filament of the device is then employed as a marker, which will be more or less visible to persons in front of the car. In order to dim the source sufficiently to avoid the objectionable glare, the luminosity is so far reduced that the marker under present practice suffers a serious reduction of its visibility and it is the purpose of my invention to enhance the visibility of the marker when the lamp is dimmed, as well as to provide a subdued general illumination in conjunction with a main projected beam when the lamp is burning full.

I attain the objects of the invention by providing a screen to obscure direct vision of the filament, and concentrating reflected light on the marker portion.

To clearly illustrate the invention, I have shown an embodiment thereof in the accompanying drawing.

Said drawing represents the optical relations in a vertical section.

An electric incandescent lamp 1 of suitable type and candle power is employed as the source of illumination. This is arranged with its center in proper focal relation to a parabolic reflector 2, which is developed from the intersection of a line, $a$, 45 degrees from the axis, $b$, with a tangent, $c$ parallel to the axis. This parabolic reflector extends forward 105° from the axis to line, $d$, where the angle of incidence of the light becomes $52\frac{1}{2}°$, the approximate limit of efficient reflection without aberration. The lamp tip, which as shown is of generally spherical contour, is provided with a marker portion 3 which extends over a zone from the axis for a space of 45°. The said marker portion may be entirely opaque or opalescent or translucent, but in any case it must be capable of reflecting or diffusing light from its outer surface. By this marker portion the direct vision of the filament is obscured. The return reflector 4 is developed rearwardly from the intersection of a line, $e$, drawn from the front aperture of reflector 2, parallel to the axis, with a line, $f$, passing from the center of the lamp 1 at 135° from the axis, or passing through the edge of the marker portion. In order that this return reflector may uniformly distribute over the outer surface of screen or marker 3, the light passing between the aperture of reflector 2 and the edge of marker 3, the curvature of the return reflector is developed from a center, $g$, located midway between the lamp center and circumference on a line bisecting the 30° angle, through which such light passes from the source to the return reflector 4. On this curvature the said reflector is developed to the 105° angle at which the main reflector 2 terminates.

When the lamp is burning full, the illumination is in the form of a powerful main parallel beam from reflector 2, supplemented by a relatively weaker general diffused illumination from the screen or marker 3.

It will be understood that between the angles of 45° and 135° from the axis, the light flux is relatively great, whereas within 45° of the two poles of the lamp, the illumination is comparatively much weaker. In the angle embraced by return reflector 4, the total light flux is considerably greater than that embraced directly by the marker 3, so that if the marker were in the form of an opaque screen, the light reflected upon its outer surface would produce a stronger luminosity than the light transmitted directly through that angle from the source. Furthermore, the total area of the marker portion is less than that represented by the angle between 105° and 135°, so that a concentration of light is effected on the screen 3 which enables it to serve advantageously as a marker when the lamp is dimmed, as well as to provide a general diffused illumination outside of the main parallel beam during full burning. The invention, however, is not limited to a screen which is entirely opaque, and I prefer to employ an opalescent or translucent screen so that in addition to the luminosity produced by the reflected light, the marker portion also receives the light transmitted directly through it from the source. In this way, the two luminous effects are superposed one upon the other, with a resulting higher degree of luminosity. The terms opalescent and translucent are used interchangeably, as both perform substantially the same functions and are therefore to be regarded as equivalents for the purposes of the present invention.

I have shown and described a specific embodiment of the invention, and while I consider its embodiment in this general type of illuminating apparatus as offering peculiar advantages and constituting a specific subject matter of invention, I also wish to claim as my invention, the broad principle of producing luminosity by simultaneously passing a light flux through and reflecting another light flux from, the object to be rendered luminous.

I claim:—

1. Apparatus of the character described, comprising in combination an electric incandescent lamp having a bulb which constitutes a screen at the tip, means for reflecting a portion of the total light flux in the form of a beam, and means for reflecting another portion of the total light flux against the outer surface of said lamp bulb at the tip to be reflected therefrom.

2. Apparatus of the character described, comprising in combination a light source, a screen therefor, and means for reflecting a prescribed portion of the light from said source in substantially even distribution over substantially the entire outer surface of said screen.

3. A luminous device comprising in combination, an opalescent screen, means for passing a light flux through said screen, and means for supplying a light flux to substantially the entire outer surface of said screen in a direction to be reflected therefrom with the light transmitted therethrough.

4. A luminous device comprising in combination, a light source, an opalescent screen in position to permit transmission of light through the same from said source, and means for supplying an additional flux of light to be reflected from the entire surface area of said screen with the transmitted light.

5. A luminous device comprising in combination, an opalescent screen, means for introducing a light flux into the interior of said screen for transmission therethrough, and means for uniformly distributing a beam of light over substantially the entire outer surface of said body for reflection therefrom with the transmitted light.

6. A projector comprising in combination, an electric incandescent lamp having an opalescent tip, a main reflector in proper focal relation with said light source to produce a relatively powerful beam, and a return reflector for distributing over substantially the entire outer surface of said opalescent tip, the light flux passing between the opalescent tip and the aperture of said main reflector, to augment by reflected light the transmitted light passing through said tip.

JOSEPH T. ROFFY.